[12] United States Patent
Bradfield

(10) Patent No.: US 12,034,336 B2
(45) Date of Patent: Jul. 9, 2024

(54) COOLING SYSTEM FOR AN ELECTRIC MACHINE HAVING A WOUND FIELD ROTOR

(71) Applicant: BorgWarner Inc., Auburn Hills, MI (US)

(72) Inventor: Michael Duane Bradfield, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 8 days.

(21) Appl. No.: 17/540,333

(22) Filed: Dec. 2, 2021

(65) Prior Publication Data

US 2023/0179037 A1 Jun. 8, 2023

(51) Int. Cl.
 *H02K 3/52* (2006.01)
 *H02K 1/20* (2006.01)

(52) U.S. Cl.
 CPC .............. *H02K 1/20* (2013.01); *H02K 3/527* (2013.01); *H02K 2201/09* (2013.01)

(58) Field of Classification Search
 CPC ...... H02K 1/20; H02K 3/527; H02K 2201/09; H02K 1/26
 See application file for complete search history.

(56) References Cited

U.S. PATENT DOCUMENTS

| | | | |
|---|---|---|---|
| 4,330,726 A | 5/1982 | Albright | |
| 4,912,350 A | 3/1990 | Parshall et al. | |
| 5,331,238 A | 7/1994 | Johnsen | |
| 7,633,194 B2 | 12/2009 | Dawsey | |
| 8,201,316 B2 | 6/2012 | Rippel et al. | |
| 8,269,384 B2 | 9/2012 | Bradfield | |

(Continued)

FOREIGN PATENT DOCUMENTS

| | | |
|---|---|---|
| CN | 101232211 A | 7/2008 |
| CN | 101790831 A | 7/2010 |

(Continued)

OTHER PUBLICATIONS

CN111769674A English translation (Year: 2023).*

(Continued)

*Primary Examiner* — Christopher M Koehler
*Assistant Examiner* — Viswanathan Subramanian
(74) *Attorney, Agent, or Firm* — CANTOR COLBURN LLP

(57) ABSTRACT

A wound field rotor includes a shaft having an outer surface, an inner surface defining a flow path, and an opening defining a passage extending from the flow path through the outer surface. A plurality of laminations is mounted to the outer surface. The plurality of laminations includes an inner annular surface disposed on the shaft and an outer annular surface defining a plurality of rotor teeth. A plurality of field windings is disposed about corresponding ones of the plurality of rotor teeth. A first portion of the plurality of rotor laminations includes a first passage portion that extends from the inner annular surface radially outwardly and is fluidically connected to the passage, and a second portion of the plurality or rotor laminations adjacent the first portion includes a second passage portion that includes a first end that registers with the first passage portion and a second end.

21 Claims, 4 Drawing Sheets

(56) References Cited

U.S. PATENT DOCUMENTS

| | | |
|---|---|---|
| 8,395,287 B2 | 3/2013 | Bradfield |
| 8,427,018 B2 | 4/2013 | Dutau et al. |
| 8,872,399 B2 | 10/2014 | Chamberlin et al. |
| 2006/0284511 A1 | 12/2006 | Evon et al. |
| 2007/0013241 A1 | 1/2007 | Schiferl et al. |
| 2008/0100159 A1 | 5/2008 | Dawsey et al. |
| 2012/0080964 A1 | 4/2012 | Bradfield |
| 2014/0070640 A1 | 3/2014 | Tolpadi et al. |
| 2015/0076935 A1* | 3/2015 | Bulatow ............... H02K 3/487 |
| | | 310/214 |
| 2016/0149448 A1 | 5/2016 | Koenig et al. |
| 2016/0149450 A1 | 5/2016 | Horii et al. |
| 2016/0372983 A1* | 12/2016 | Okochi ................ H02K 1/32 |
| 2020/0227977 A1 | 7/2020 | Bradfield |
| 2021/0367461 A1* | 11/2021 | Barti .................... H02K 15/10 |
| 2022/0239170 A1 | 7/2022 | Bradfield |
| 2023/0179049 A1 | 6/2023 | Fulton et al. |
| 2024/0006961 A1 | 1/2024 | Bradfield |

FOREIGN PATENT DOCUMENTS

| | | | |
|---|---|---|---|
| CN | 102893496 A | 1/2013 | |
| CN | 102934328 A | 2/2013 | |
| CN | 103155376 A | 6/2013 | |
| CN | 103326483 A | 9/2013 | |
| CN | 105048662 A | 11/2015 | |
| CN | 106716794 A | 5/2017 | |
| CN | 207150273 U | 3/2018 | |
| CN | 111769674 A * | 10/2020 | ............. H02K 1/265 |
| DE | 102015215762 A1 | 2/2017 | |
| JP | 2006033916 A | 2/2006 | |

OTHER PUBLICATIONS

International Search Report and Written Opinion for International Application No. PCT/US2020/013073; International Filing Date Jan. 10, 2020; Report Mail Date May 8, 2020 (pp. 1-8).

Chinese Application No. 202080009172.9 filed Jul. 14, 2021; Chinese Office Action dated Oct. 21, 2023; 10 pages.

* cited by examiner

COOLING SYSTEM FOR AN ELECTRIC MACHINE HAVING A WOUND FIELD ROTOR

BACKGROUND OF THE INVENTION

Exemplary embodiments pertain to the art of electric motors and, more particularly, to a cooling system for an electric machine having a wound field rotor.

During operation, electric motors produce heat. Often times, rotating components of an electric motor may support a fan member that directs a flow of air through internal motor components. The flow of air may help with smaller systems, such as alternators, and systems that are installed in in open areas, such as generators. The flow of air is not always sufficient in high output systems, particularly those installed in closed areas, such as motor vehicle engine compartments.

Electric motors that are employed as prime movers in a motor vehicle typically include a liquid coolant system. The electric motor includes a stator and a rotor. The liquid cooling system may include an inlet that receives coolant and an outlet that guides coolant to a heat exchange system. The coolant may flow in a jacket arranged radially outwardly of a stator of the electric motor. Additional coolant may be directed onto the rotor, or between the rotor and a shaft supporting the rotor.

Cooling external surfaces of the rotor laminations and as well as an interface between the rotor laminations and the shaft is beneficial. However, remaining portions of the rotor also produce heat that can detract from an overall operational efficiency. Accordingly, the industry would be receptive to a cooling system that interacts with internal rotor surfaces as well as rotor winding surfaces to increase operating efficacy.

BRIEF DESCRIPTION OF THE INVENTION

A wound field rotor in accordance with a non-limiting example includes a shaft including an outer surface, an inner surface defining a flow path, and an opening defining a passage extending from the flow path through the outer surface. A plurality of laminations is mounted to the outer surface. The plurality of laminations include an inner annular surface disposed on the shaft and an outer annular surface defining a plurality of rotor teeth. A plurality of field windings is disposed about corresponding ones of the plurality of rotor teeth. Adjacent ones of the plurality of field windings are spaced one from another by a channel. A first portion of the plurality of rotor laminations includes a first passage portion that extends from the inner annular surface radially outwardly and is fluidically connected with the passage, and a second portion of the plurality or rotor laminations adjacent the first portion includes a second passage portion that includes a first end that registers with the first passage portion and a second end.

An electric machine in accordance with a non-limiting example includes a housing having an outer surface portion and an inner surface portion. A stator including a stator winding is mounted to the inner surface portion of the housing. A wound field rotor is rotatably supported within the housing radially inwardly of the stator. The wound field rotor includes a shaft having an outer surface, an inner surface defining a flow path, and an opening defining a passage extending from the flow path through the outer surface. A plurality of laminations is mounted to the outer surface. The plurality of laminations includes an inner annular surface disposed on the shaft and an outer annular surface defining a plurality of rotor teeth. A plurality of field windings is disposed about corresponding ones of the plurality of rotor teeth. Adjacent ones of the plurality of field windings are spaced one from another by a channel. A first portion of the plurality of rotor laminations includes a first passage portion that extends from the inner annular surface radially outwardly and is fluidically connected with the passage and a second portion of the plurality or rotor laminations adjacent the first portion includes a second passage portion spaced from the inner annular surface that includes a first end that registers with the first passage portion and a second end.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
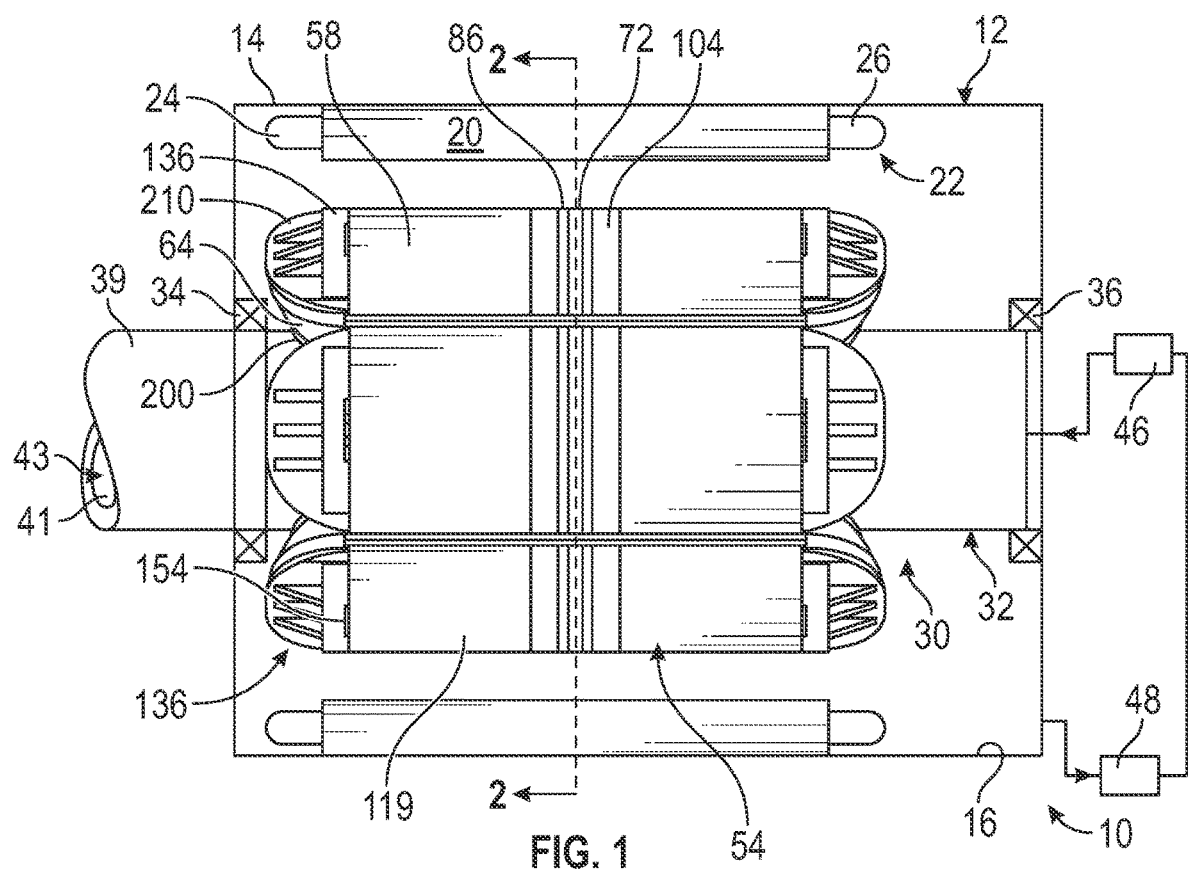
FIG. 1 depicts a cross-sectional side view of an electric machine including a would field rotor having a cooling system, in accordance with a non-limiting example.

An electric machine, in accordance with a non-limiting example, is indicated generally at 10 in FIG. 1. Electric machine 10 includes a housing 12 having an outer surface 14 and an inner surface 16. A stator 20 is fixedly connected to inner surface 16. Stator 20 includes stator windings 22 having a first end turn 24 and a second end turn 26. A wound field rotor 30 is rotatably mounted in housing 12 radially inwardly of stator 20. Would field rotor 30 is supported on a shaft 32 in housing 12.

In a non-limiting example, shaft 32 is supported at a first end (not separately labeled) by a first bearing 34 and at a second end (also not separately labeled) by a second bearing 36. Shaft 32 includes an outer surface 39 and an inner surface 41 that defines a coolant flow path 43. Coolant, such as oil, is passed from a coolant supply system 46 through flow path 43, internally through wound field rotor 30 and into housing 12 before passing to a coolant drain system 48. Coolant may flow through a plurality of passages, one of which is indicated at 50 (FIG. 2), that extend through shaft 32.

In a non-limiting example, wound field rotor 30 includes a plurality of laminations 54 having an inner, annular, surface 56 and a discontinuous outer, annular, surface 58 that define a plurality of rotor teeth 60. A plurality of field windings 64 are wrapped around each of the plurality of rotor teeth 60. A plurality of channels, one of which is indicated at 66 is defined between adjacent ones of the plurality of field windings 64. As will be detailed herein, plurality of laminations 54 define an internal cooling circuit 68 that is disposed between inner, annular surface 56 and discontinuous outer, annular, surface 58. As will become more fully evident herein, cooling circuit 68 includes a first circuit portion 70 that feeds each of channels 66 thereby cooling internal surfaces of field windings 64 and a second circuit portion 71 that extends axially through laminations 54 to cool wound field rotor 30 internally as well as spray coolant onto first and second stator end turns 24 and 26.

Figure 2:
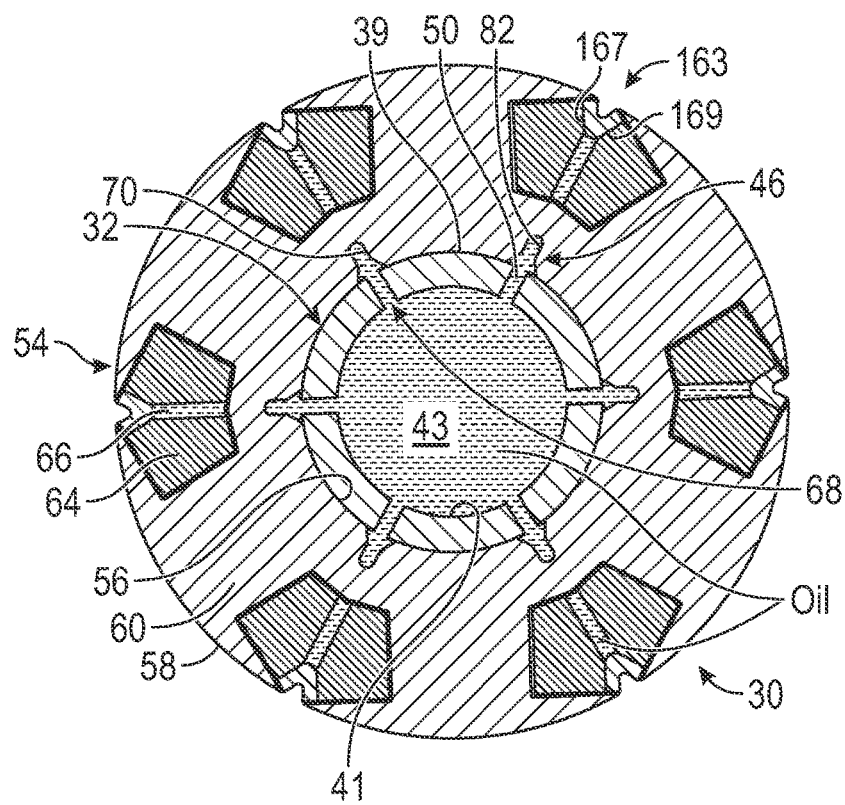
FIG. 2 depicts a cross-sectional axial end view of the wound field rotor of FIG. 1 taken through the lines 2-2.
Figure 3:
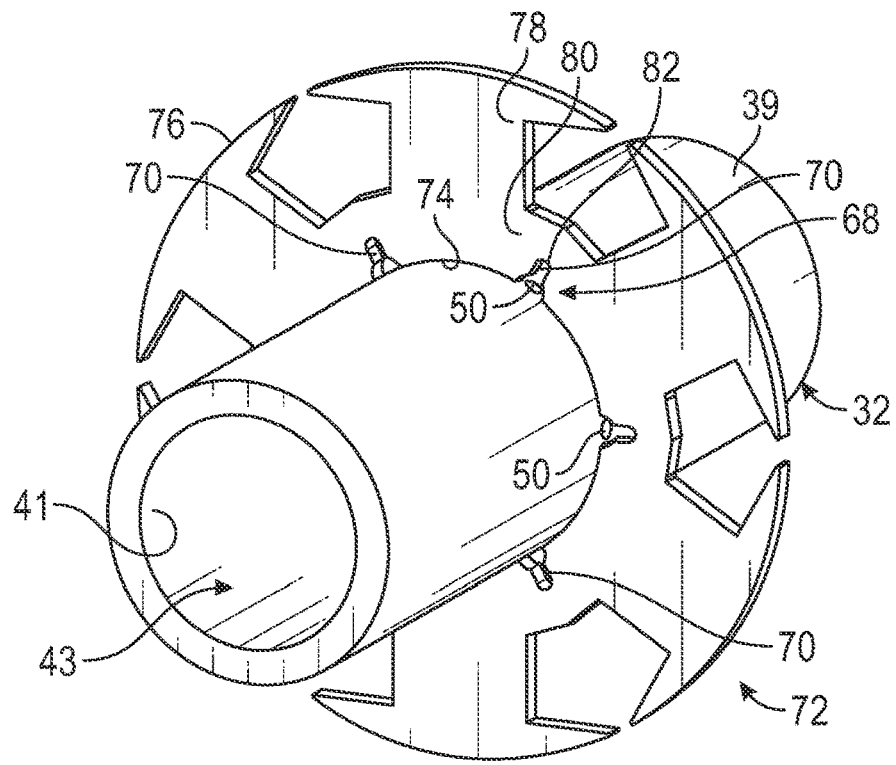
FIG. 3 depicts a plan view of a rotor lamination of the wound field rotor of FIG. 2.

Reference will follow to FIGS. 3-6 with continued reference to FIGS. 1 and 2 in describing different lamination portions of laminations 54. Rotor laminations 54 include a first or central lamination portion(s) 72 (FIG. 3) having a first inner surface portion 74, a first outer surface portion 76 and a first plurality of rotor tooth elements 78 joined by a first web portion 80. A first passage portion 82 extends from first inner surface portion 74 into first web portion 80. First passage portion 82 aligns with passage 50 and defines a coolant inlet. At this point, it should be understood, that a first passage portion is provided at each passage 50.

Figure 4:
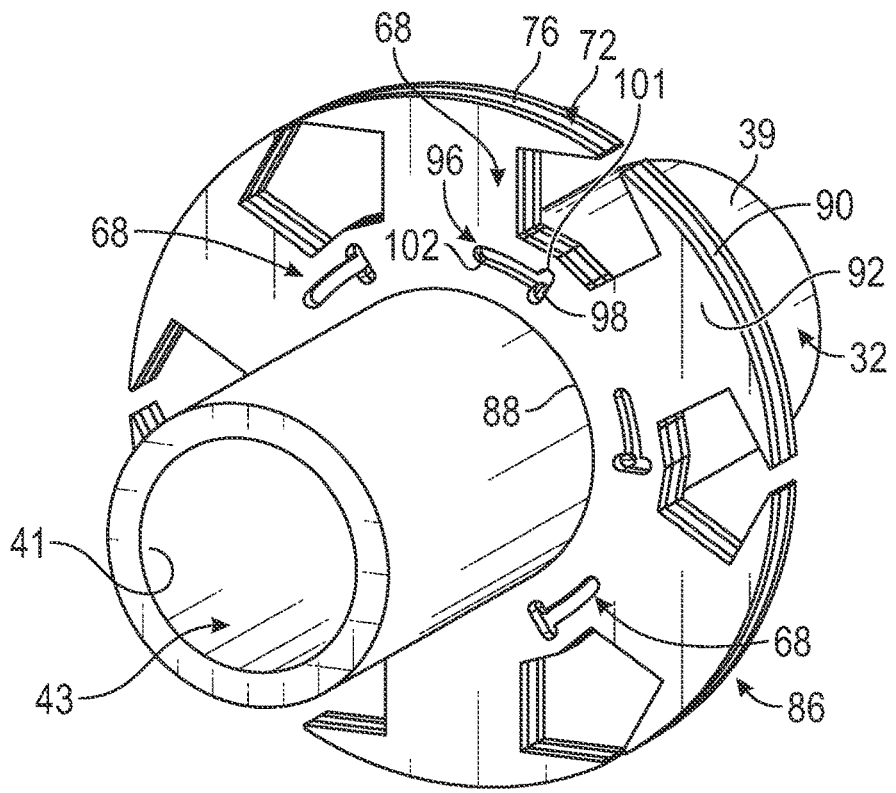
FIG. 4 depicts a plan view of another rotor lamination of the wound field rotor of FIG. 2.

A second lamination portion 86 is depicted in FIG. 4. Second lamination portion 86 is positioned adjacent to each side of first lamination portion 72. Second lamination portion 86 includes a second inner surface portion 88 and a second outer surface portion 90 that defines a plurality of rotor tooth elements 92. Rotor tooth elements 92 are joined by a second web portion 94. A second passage portion 96 is defined in second web portion 94. Second passage portion 96 includes a first end 98 that extends generally radially along second web portion 94 and a second end 100 that connects with first end 98 and extends circumferentially along second web portion 94. First end 98 registers with first passage portion 82 and includes an outer end 101. Second end 100 includes an inner end 102.

Figure 5:
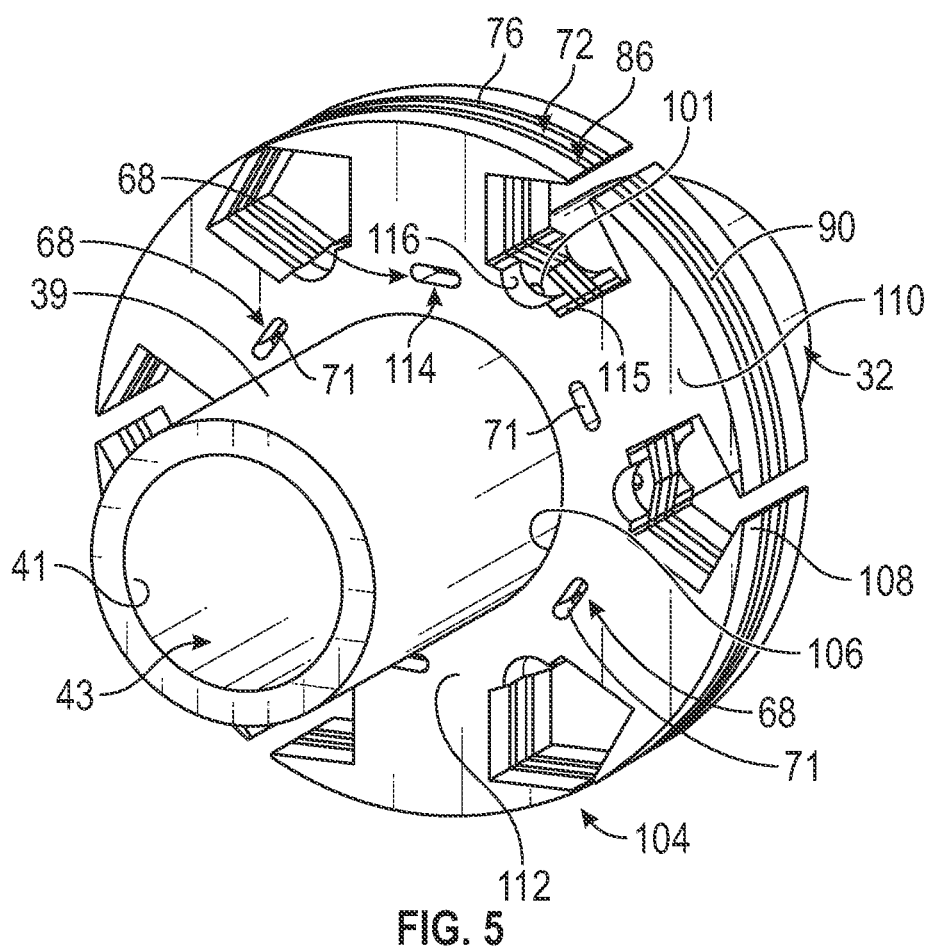
FIG. 5 depicts a plan view of yet another rotor lamination of the wound field rotor of FIG. 2.

A third lamination portion 105, in accordance with a non-limiting example, is shown in FIG. 5. Third lamination portion 105 includes a third inner surface portion 106 and a third outer surface portion 108 that defines a third plurality of tooth elements 110. Tooth elements 110 are joined by a third web portion 112. A third passage portion 114 is defined in third web portion 112 at each of the plurality of tooth elements 110. In addition, third web portion 112 includes a radial outer surface 115 that extends between adjacent tooth elements 110. A scallop region 116 is formed in radial outer surface 115 so as to expose outer edge 101 of second passage portion 96. In this wall, fluid passing into first passage portion 82 may flow into second passage portion 96 and a first portion of the fluid may pass from outer end 101 into each channel 66 and a second portion of the fluid may pass through inner end 102 and into third passage portion 114. Thus, second passage portion 96 divides cooling circuit 68 into the first and second circuit portions 70 and 71.

Figure 6:
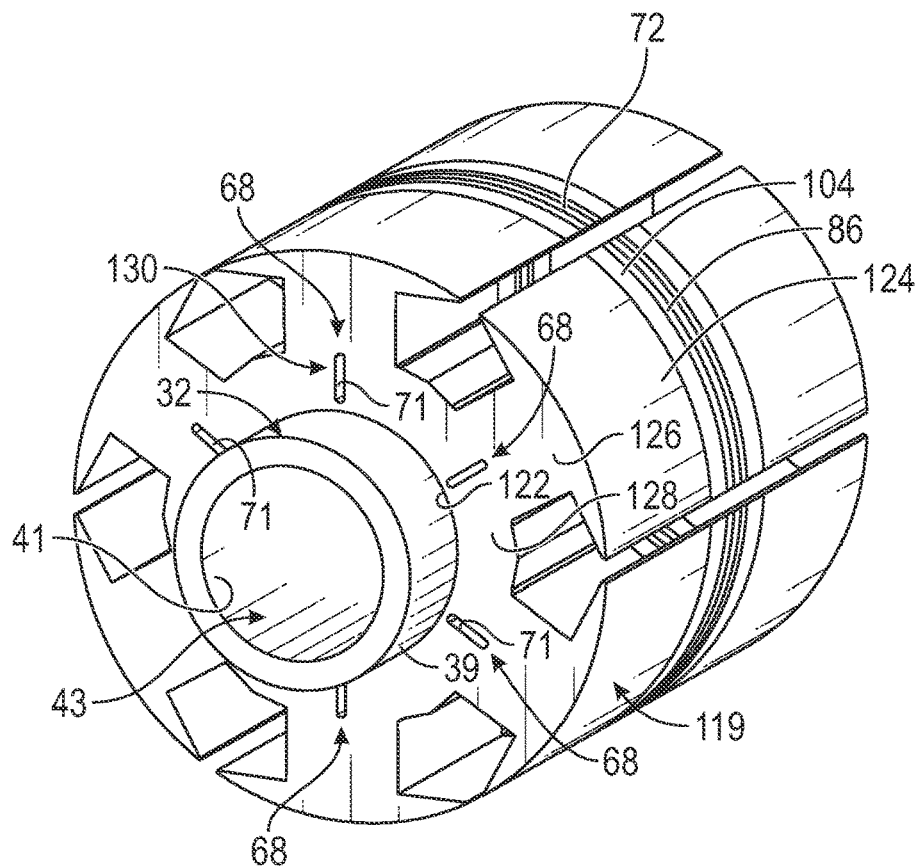
FIG. 6 depicts a plan view of still yet another rotor lamination of the wound field rotor of FIG. 2.
Figure 7:
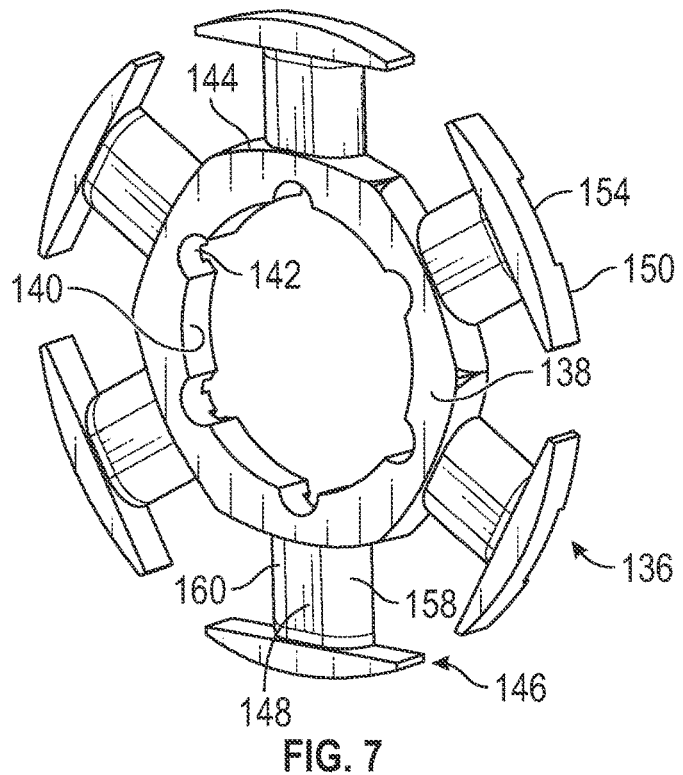
FIG. 7 depicts a plan view of a winding end turn insulator, in accordance with a non-limiting example.

A fourth lamination portion 119, in accordance with a non-limiting example, is shown in FIG. 6. Fourth lamination portion 119 is positioned against third lamination portion 104 and includes a fourth inner surface portion 122 and a fourth outer surface portion 124 that defines a plurality of tooth elements 126. Tooth elements 126 are joined by a fourth web portion 128. Fourth lamination portion 119 includes a fourth passage portion 130 that is positioned on fourth web portion 128 at each tooth element 126. Fourth passage portion 130 extends radially along fourth web portion 128 and fluidically connects with third passage portion 114 forming second circuit portion 71 of cooling circuit 68 that extends from each third lamination portion 104 axially along laminations 54.

In a non-limiting example, an end turn insulator 136 is mounted to fourth lamination portions 119 at each axial end (not separately labeled) of laminations 54. End turn insulator 136 includes a central web 138 having an inner surface section 140 including a plurality of recesses 142. Recesses 142 may be arranged to accommodate fasteners (not shown) that join laminations 54. End turn insulator 136 also includes an outer surface section 144 from which extends a plurality of teeth supports 146 that provide structural support to rotor teeth 60. Each of the plurality of tooth supports 146 includes a first surface 148 that may be an axially outwardly facing surface 148 and a second surface 150 that may be an axially inwardly facing surface. End turn insulator 136 further includes a first axially extending surface 200 and a second axially extending surface 210. End turn 64 extends about end turn insulator 136 between first axially extending surface 200 and second axially extending surface 210.

In a non-limiting example, second surface 150 includes a channel 154 that directs coolant, flowing from fourth passage portion 130 radially outwardly onto first end turn 24 and second end turn 26. In a non-limiting example, first surface 148 includes a first angled surface 158 and a second angled surface 160 that help guide and support the one of the plurality of field windings 64 extending about each of the plurality of rotor teeth 60. Thus, not only do end turn insulators 136 support the plurality of laminations 54 but also provide a guide and insulator for each field winding 64 and also form part of the cooling circuit 68. Moreover, end turn insulators 136 may be employed to establish a desired rotational balance for wound field rotor 30.

In a non-limiting example, wound field rotor 30 also includes a plurality of field separators, one of which is indicated at 163 in FIGS. 1 and 2. Field separator 163 extends between adjacent ones of the plurality of rotor teeth 60 and bridge each channel 66. Field separator 163 include a generally v-shaped cross-section and are made from a compliant material. Each field separator 163 includes a first leg 167 that engages with one of the plurality of rotor teeth 60 and a second leg 169 that engages with an adjacent one of the plurality of rotor teeth 60. In a non-limiting example, field separator 163 may flex as torque is generated by field wound rotor 30. In this manner, Field separator 163 may retain coolant in each channel 66 but also accommodate some leakage that flings coolant onto stator 20 to provide additional cooling.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A wound field rotor comprising:
a shaft including an outer surface, an inner surface defining a flow path, and an opening defining a passage extending from the flow path through the outer surface;
a plurality of rotor laminations mounted to the outer surface, the plurality of rotor laminations including an inner annular surface disposed on the shaft and an outer annular surface defining a plurality of rotor teeth;
a plurality of field windings disposed about corresponding ones of the plurality of rotor teeth, adjacent ones of the plurality of field windings being spaced one from another by a channel; and
a cooling circuit extending through the plurality of rotor laminations, the cooling circuit including a first circuit portion that extends axially through the plurality of rotor laminations and a second circuit portion that extends radially along the plurality of rotor laminations,
wherein a first portion of the plurality of rotor laminations includes a first passage portion that extends from the inner annular surface radially outwardly and is fluidically connected with the passage,
wherein a second portion of the plurality of rotor laminations arranged adjacent the first portion includes a second passage portion spaced from the inner annular surface, the second passage portion including a first end that forms a first section of the second circuit portion, the first end being fluidically connected with the first passage portion and the channel to direct fluid between adjacent windings and a second end that is spaced from the first end, the second end of the second passage portion forming a first segment of the first circuit portion, and
wherein the first end of the second passage portion is circumferentially spaced from the second end of the second passage portion.

2. The wound field rotor according to claim 1, wherein a third portion of the plurality of rotor laminations adjacent the second portion includes a scalloped region disposed between adjacent ones of the plurality of rotor teeth exposing the first end of the second passage portion.

3. The wound field rotor according to claim 1, further comprising: a field separator disposed between adjacent ones of the plurality of field windings, the field separator closing the channel.

4. The wound field rotor according to claim 3, wherein the field separator extends from one of the plurality of rotor teeth to an adjacent one of the plurality of rotor teeth across the channel.

5. The wound field rotor according to claim 4, wherein the field separator includes a V-shaped cross-section.

6. The wound field rotor according to claim 5, wherein the field separator is formed from a compliant material.

7. The wound field rotor according to claim 1, further comprising: an end turn insulator mounted to the plurality of rotor laminations, the end turn insulator including a central web that extends about the shaft and a plurality of rotor tooth supports, wherein the plurality of rotor tooth supports include a first surface facing the plurality of rotor laminations and a second surface that is opposite the first surface.

8. The wound field rotor according to claim 7, wherein the first surface of at least one of the plurality of rotor tooth supports abuts one of the plurality of rotor laminations, the first surface including a radial channel that directs coolant radially outwardly.

9. The wound field rotor according to claim 8, wherein the second surface of each of the plurality of rotor tooth supports includes angled surfaces that guide select ones of the plurality of field windings about corresponding ones of the plurality of rotor teeth.

10. The wound field rotor according to claim 9, wherein each of the plurality of rotor tooth supports includes a first axially outwardly extending surface and a second axially outwardly extending surface, each of the plurality of field windings being disposed between the first and second axially outwardly extending surfaces on corresponding ones of each of the plurality of rotor tooth supports.

11. The wound field rotor according to claim 1, wherein the first end of the second passage portion extends radially along each of the second portion of the plurality of rotor laminations.

12. The wound field rotor according to claim 1, wherein a third portion of the plurality of rotor laminations arranged adjacent the second portion includes a third passage portion including a first end section fluidically connected to the second end of the second passage portion to form a second section of the first passage portion of the cooling circuit.

13. The wound field rotor according to claim 12, wherein a fourth portion of the plurality of rotor laminations arranged adjacent the third portion of the plurality of rotor laminations includes a fourth passage portion including a first end section fluidically connected to the third passage portion of the third passage portion of the cooling circuit to form at least another section of the first passage portion of the cooling circuit.

14. The wound field rotor according to claim 12, further comprising:
an end turn insulator mounted to the plurality of rotor laminations, the end turn insulator including a central web that extends about the shaft and a plurality of rotor tooth supports, wherein the plurality of rotor tooth supports include a first surface facing the plurality of rotor laminations and a second surface that is opposite the first surface, wherein the first surface of the at least one of the plurality of rotor tooth supports abuts one of the plurality of rotor laminations, the first surface including a radial channel that is fluidically connected to the second section of the first passage portion, the radial channel directing coolant radially outwardly.

15. An electric machine comprising:
a housing having an outer surface portion and an inner surface portion;
a stator including a stator winding mounted to the inner surface portion of the housing; and
a wound field rotor rotatably supported within the housing radially inwardly of the stator, the wound field rotor comprising:
a shaft including an outer surface, an inner surface defining a flow path, and an opening defining a passage extending from the flow path through the outer surface;
a plurality of rotor laminations mounted to the outer surface, the plurality of rotor laminations including an inner annular surface disposed on the shaft and an outer annular surface defining a plurality of rotor teeth; and a plurality of field windings disposed about corresponding ones of the plurality of rotor teeth, adjacent ones of the plurality of field windings being spaced one from another by a channel, wherein a first portion of the plurality of rotor laminations includes a first passage portion that extends from the inner annular surface radially outwardly and is fluidically connected with the passage, wherein a second portion of the plurality of rotor laminations adjacent the first portion includes a second passage portion spaced from the inner annular surface, the second passage portion including a first end that is fluidically connected with the first passage portion and the channel to direct fluid between adjacent field windings, and wherein a third portion of the plurality of rotor laminations adjacent the second portion includes a scalloped region disposed between adjacent ones of the plurality of rotor teeth exposing the first end of the second passage portion and a third passage portion including a first end section fluidically connected to the second end of the second passage portion.

16. The electric machine according to claim 15, wherein a fourth portion of the plurality of rotor laminations includes a fourth passage portion fluidically connected to the third passage portion, the first passage portion, the second passage portion, the third passage portion, and the fourth passage portion forming a labyrinth cooling circuit that directs fluid axially through the plurality of rotor laminations and radially outwardly into the channel between adjacent field windings.

17. The electric machine according to claim 15, further comprising: a field separator disposed between adjacent ones of the plurality of field windings, the field separator closing the channel.

18. The electric machine according to claim 15, further comprising: an end turn insulator mounted to the plurality of rotor laminations, the end turn insulator including a central web that extends about the shaft and a plurality of rotor tooth supports, wherein the plurality of rotor tooth supports include a first surface facing the plurality of rotor laminations and a second surface that is opposite the first surface.

19. The electric machine according to claim 18, wherein each of the plurality of rotor tooth supports includes a first surface abutting one of the plurality of rotor laminations and a second surface, the first surface including the channel that directs coolant radially outwardly.

20. A wound field rotor comprising:
a shaft including an outer surface, an inner surface defining a flow path, and an opening defining a passage extending from the flow path through the outer surface;
a plurality of rotor laminations mounted to the outer surface, the plurality of rotor laminations including an inner annular surface disposed on the shaft and an outer annular surface defining a plurality of rotor teeth;
a plurality of field windings disposed about corresponding ones of the plurality of rotor teeth, adjacent ones of the plurality of field windings being spaced one from another by a channel; and
a cooling circuit extending through the plurality of rotor laminations, the cooling circuit including a first circuit portion that extends axially through the plurality of rotor laminations and a second circuit portion that extends radially along the plurality of rotor laminations, wherein a first portion of the plurality of rotor laminations includes a first passage portion that extends from the inner annular surface radially outwardly and is fluidically connected with the passage, and wherein a second portion of the plurality of rotor laminations arranged adjacent the first portion includes a second passage portion spaced from the inner annular surface, the second passage portion including a first end that forms a first section of the second circuit portion, the first end being fluidically connected with the first passage portion and the channel to direct fluid between adjacent windings and a second end that is spaced from the first end, the second end of the second passage portion forming a first segment of the first circuit portion, and wherein a third portion of the plurality of rotor laminations adjacent the second portion includes a scalloped region disposed between adjacent ones of the plurality of rotor teeth exposing the first end of the second passage portion.

21. The wound field rotor according to claim 20, wherein the third portion of the plurality of rotor laminations also includes a third passage portion including a first end section fluidically connected to the second end of the second passage portion; and wherein a fourth portion of the plurality of rotor laminations includes a fourth passage portion fluidically connected to the third passage, the first passage portion, the second passage portion, the third passage portion, and the fourth passage portion forming a labyrinth cooling circuit that directs fluid axially through the plurality of rotor laminations and radially outwardly into the channel between adjacent field windings.

* * * * *